Dec. 7, 1937. E. KATO 2,101,395
OPERATING APPARATUS FOR FLYER FRAMES
Filed Jan. 5, 1937 3 Sheets-Sheet 1

INVENTOR.
E. Kato
BY
Glascock Downing & Seebold
ATTORNEYS.

Dec. 7, 1937.  E. KATO  2,101,395
OPERATING APPARATUS FOR FLYER FRAMES
Filed Jan. 5, 1937  3 Sheets-Sheet 2
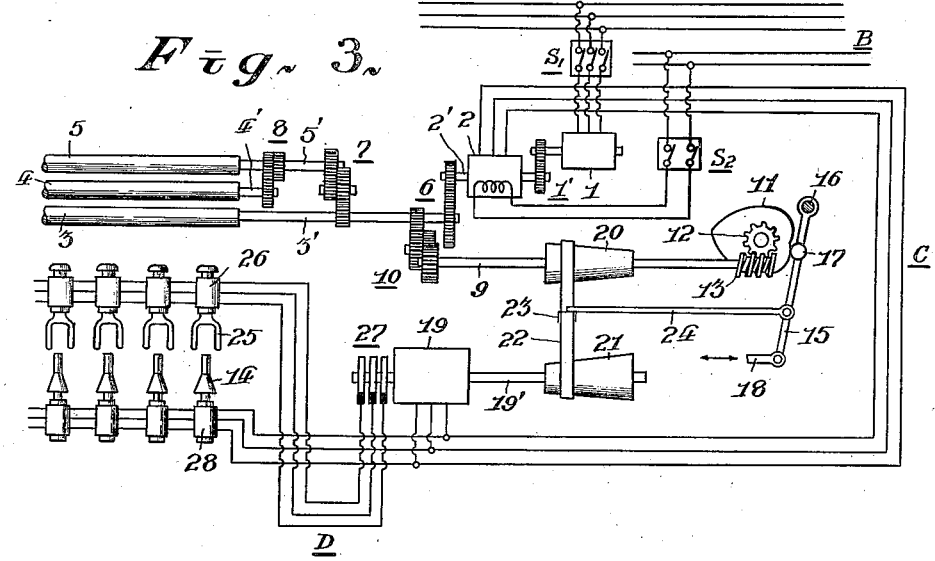
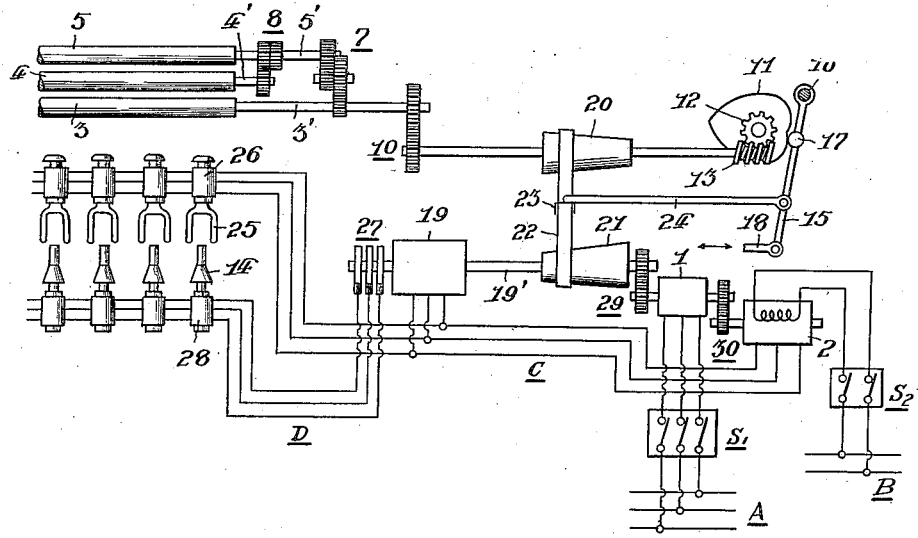
INVENTOR.
E. Kato
BY
Glascock Downing & Seebold
ATTORNEYS Patented Dec. 7, 1937

2,101,395

UNITED STATES PATENT OFFICE 2,101,395

OPERATING APPARATUS FOR FLYER FRAMES

Etsuro Kato, Hara-Machi, Meguro-Ku, Tokyo-Shi, Japan

Application January 5, 1937, Serial No. 119,143
In Japan June 20, 1936

3 Claims. (Cl. 118—43)

This invention relates to improvements in operating apparatus for flyer frame, and has for its object to provide an electrically associated arrangement adapted to always maintain a certain operative relation among the rollers of the draft apparatus, the flyers and the bobbins in the working or at the stop.

The special feature of the invention resides in that the electric motors for driving the draft apparatus, the flyers and the bobbins respectively are electrically interconnected so as to vary the characteristic of the circuits in accordance with the winding condition of the bobbins for changing the speed of the said motors.

The accompanying drawings illustrate embodiments of the invention by way of example, in which:

Figs. 3, 4 and 5 are similar views to Fig. 1 illustrating a modified arrangement respectively.

Figure 1:
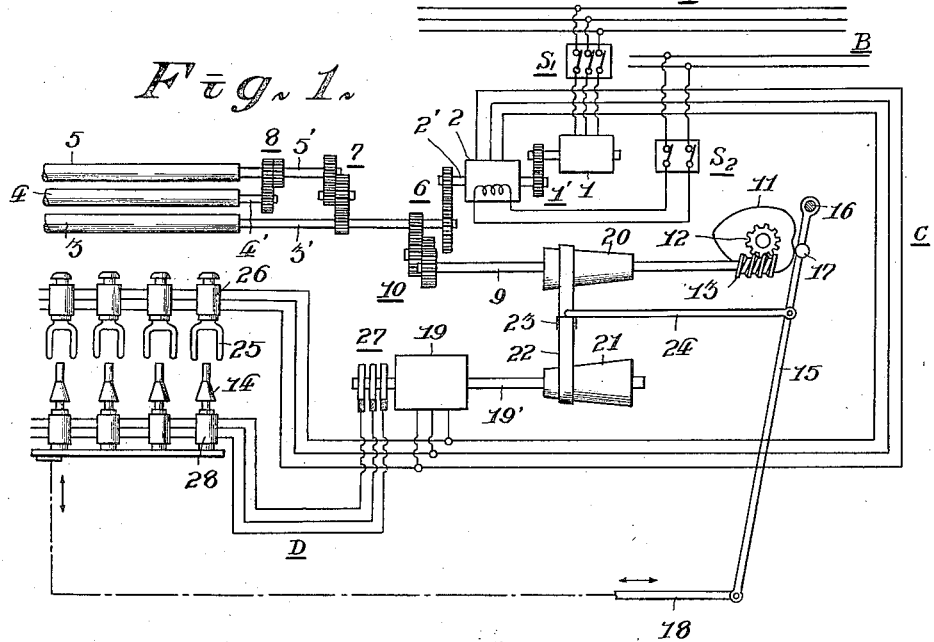
Fig. 1 is a diagrammatic view illustrating a mechanical and electrical arrangement embodying the invention.

Referring now to the drawings, 1 represents an induction motor for driving an alternator 2, the draft rollers 3, 4 and 5, an asynchronous generator 19 and a cam 11 for controlling the up-and-down motion or building motion of bobbins 14. This induction motor takes alternating current from the mains A by a switch $S_1$. The alternator 2 takes its exciting direct current from the mains B by a switch $S_2$ and is arranged to be driven by the induction motor 1 through geared connection 1'. The draft roller 3 is arranged to be driven from the armature shaft 2' of the alternator 2 through geared connection 6 and the draft roller 5 is arranged to be driven from the shaft 3' of the draft roller 3 through geared connection 7, and the draft roller 4 is driven from the shaft 5' of the draft roller 5 through geared connection 8. The cam 11 is arranged to be driven from the shaft 3' through geared connection 10, shaft 9, worm 13 and worm wheel 12 secured on the said cam. The rotation of the cam 11 causes an up-and-down motion or the building motion of bobbins 14 through means of a lever 15 pivoted on the machine frame at 16 and carrying a cam roller 17 engaging with the cam 11, a connection link 18 and suitable mechanism (not shown).

An asynchronous generator 19 is driven from the shaft 9 through means of conical pulleys 20 and 21 securely mounted on the shaft 9 and the rotor shaft 19' of the generator 19 respectively and a driving belt 22 arranged over the said pulleys. The belt 22 may be shifted by means of a belt shifter 23 connected with the lever 15 by means of a connecting link 24. It will be seen that the induction motor 1 controls the operation of the alternator 2, draft rollers 3, 4 and 5 and asynchronous generator 19 and the building motion of the bobbins 14.

The alternator 2 supplies alternating current of a frequency determined by its speed, the field thereof being excited by direct current, into the primary side of the asynchronous generator 19, and flyer motors 26 through the supply wires C. It will be seen that the revolving speed of the flyer motors 26 will always depend on the speed of or frequency of current fed from the alternator 2, and at the same time is in a definite relation to the revolution of the draft rollers 3, 4 and 5.

The supply wires D for the bobbin motors 28 are connected to the slip rings 27 on the secondary side of the asynchronous generator 19. It will be seen, therefore, that there is a definite relation among the revolving speed of the bobbins 14, the revolving speed of the draft rollers 3, 4 and 5 and the revolving speed of the flyers 25.

Figure 2:
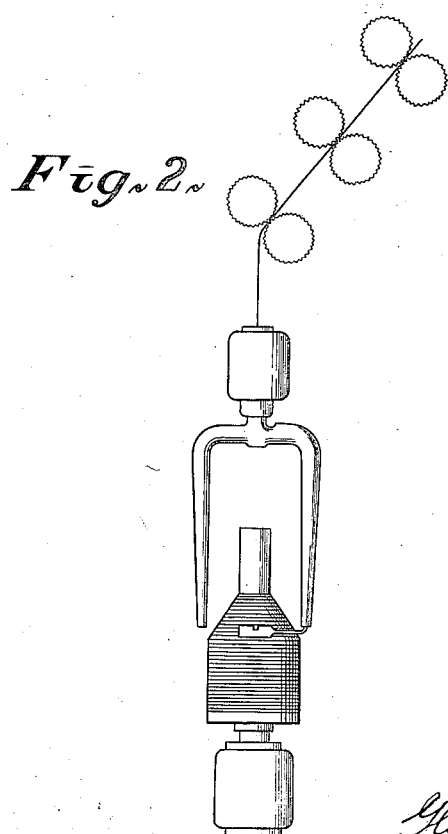
Fig. 2 is a fragmental diagrammatic view of a flyer frame for illustration.

For purpose of illustration, Fig. 2 is intended to represent the essential part of a flyer frame. The bobbin 14 is to have layers of sliver wound conically by making an up-and-down or building motion, the diameter of a sliver layer varying depending on its position wound over the bobbin, and the relative motion of the flyer and the bobbin has to be varied accordingly.

It thus follows that with such a flyer frame as referred to above a definite relation is held among the revolving speeds of the draft rollers, the flyers and the bobbins, which is expressed by $$\pi D_x(N-N') = Vb \qquad (1)$$

where $D_x$ is the diameter in centimeters of the layer of sliver wound over the bobbin, which is related to the building motion, $N'$ is the number of revolutions per minute of the flyer, $N$ is the number of revolutions per minute of the bobbin; and $Vb$ is the speed in centimeters per minute of the surface of the delivery roller 3, which is almost the same as the winding speed of the bobbin.

The motors 26 for driving the flyers 25 and the motors 28 for driving the bobbin 14 are synchronous motors, and the difference between the revolving speeds of the motor 26 and the motor 28 will be proportional to the difference between frequencies of currents supplied through the supply wires C and D, and frequency of current supplied through the supply wires C is related to frequency of current supplied through the supply wires D so as to be expressed by $$f - f' = \pm \frac{P_n}{2 \times 60} \qquad (2)$$

where $f$ and $f'$ are frequencies of currents supplied through the supply wires C and D respectively, P is number of the poles of the asynchronous generator 19 and $n$ is number of revolution per minute of the rotor of the same. Thus the difference between frequency of currents supplied through the wires C and D is proportional to number of revolutions per minute of the asynchronous generator 19.

The speed of the induction motor 1 is controlled by frequency of current supplied from the mains A, the speed of the motors 26 for driving the flyers 25 is controlled by frequency of current supplied from the alternator 2 driven by the induction motor 1 through the supply wires C, and the speed of the motors 28 for driving the bobbins 14 is controlled by frequency of current supplied from the asynchronous generator 19 through the supply wires D, the primary winding of which is energized by current supplied from the alternator 2 through the supply wires C, while the speed of the asynchronous generator 19 depends upon the shifted position of the belt shifter 23, or the building motion having a relation to the variation of the diameter of the layer of the slivers wound over the bobbin.

The relation expressed by the Equation (1) may, therefore, be held by properly selecting the gear ratio of the geared connection 10, the diameter of the conical pulleys 20 and 21 and the number of poles of the asynchronous generator 19.

Thus the spinning work may be held always under a definite condition, and if the working speed or winding speed of the draft apparatus, the revolving speed of the flyer and the diameter of the sliver layer wound over the bobbin are not related so as to meet the condition expressed by the Equation (1), the sliver will be liable to break so that the spinning work will become unable to be continued. In the operation of the frame, it is very important to always hold the relation expressed by the Equation (1) during the operation for minimizing the breakage of slivers, as even if only a sliver is broken the frame in its entirety has to be stopped from its operation for piecing the broken slivers together, whereby all the other spindles than the spindle having the broken sliver have to come to discontinue their operation, and it is also important when starting and stopping of the frame.

With the apparatus according to the invention, the revolving speeds of the draft rollers, the flyer and the bobbin are so related as to satisfy the Equation (1). On stopping the operation of the apparatus, when the switch S₁ is opened, if the switch S₂ is held closed to maintain the alternator 2 excited, the relation in the Equation (1) will be held under gradually lowering frequency of the current generated in the said alternator until it has come to stop. Similarly, the relation will also be held on the starting of the apparatus.

Fig. 3 illustrates a modification of the invention in which the motors 28 for driving the bobbins 14 are fed from the supply wires C instead of the supply wires D, the motors 26 for driving the flyers 25 are fed from the supply wires D instead of the supply wires C, the other arrangement being the same as that shown in Fig. 1, and the operation will be the same as that of the arrangement shown in Fig. 1.

Fig. 4 illustrates a further modification of the invention in which the induction motor 1 is arranged so as to drive directly both the alternator 2 and the asynchronous generator 19 through geared connections 30 and 29 respectively, and at the same time to drive the draft rollers 3, 4 and 5 at varying speeds so as to meet the building motion through means of the conical pulleys 21, 20 and the shifting belt 20 thereon. Thus the variation of the revolving speed of the draft rollers varies the delivery speed of slivers in accordance with the shifted position of the belt on the pulleys. In this case, the rate of draft, that is, the ratio of the surface speeds of the back roller, middle roller and front roller is almost constant while the ratio of the number of revolutions of these rollers remains unchanged, and consequently the uniformity of the delivered slivers can be ensured, and the relation expressed by the Equation (1) is to be held among the draft apparatus, flyer and bobbin as in the case of Figure 1.

Figure 5:
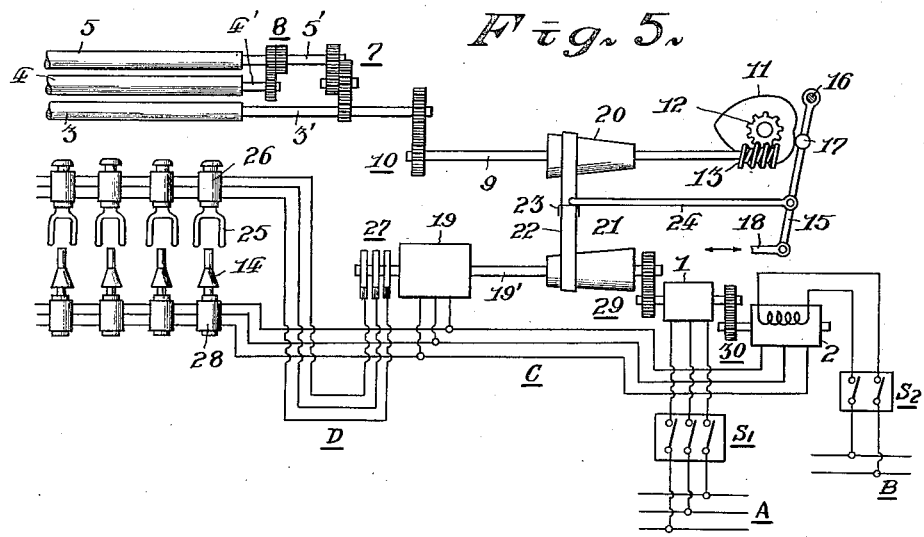

Fig. 5 illustrates a further modification of the invention similar to Fig. 4 except that the motors 26 for driving the flyers 25 are fed from the supply wires D instead of the supply wires C, and the motors 28 for driving the bobbins 14 are fed from the supply wires C instead of the supply wires the function being the same as that shown in Fig. 4.

Figure 6:
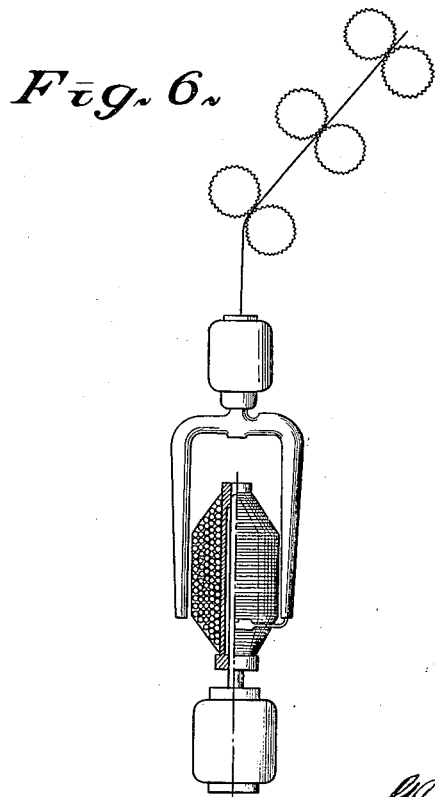
Fig. 6 is a similar view to Fig. 2 of another type of the flyer frame.

The foregoing has been described in connection with the building motion in case of sliver wound conically over the bobbin as shown in Fig. 2 for purpose of illustration, but will be similar in connection with the building motion in case of sliver wound over the bobbin as shown in Fig. 6.

I claim:

1. An operating apparatus for a flyer frame comprising, two mutually associated generators, motors for driving the flyers and motors for rotating movable bobbins, one of said generators providing a supply source for the motors for driving the flyers and the other of said generators providing a current supply for the motors driving the bobbins, draft apparatus driven in association with said generators, and means for varying the speed of the draft apparatus relative to the speed of the bobbins in accordance with the winding movement of the bobbins.

2. An operating apparatus for a flyer frame according to claim 1 comprising two generators associated with a motor for driving draft apparatus, one of said generators providing a supply source for the motors driving the flyers and the other of said generators providing a supply source for the motors driving the bobbins, and means arranged to change the electric characteristics of the output of one of said generators in accordance with a winding movement of the bobbins.

3. An operating apparatus for a flyer frame according to claim 1 comprising two mutually associated generators, one of said generators providing a supply source for the motors driving the flyers and the other of said generators providing a supply source for the motors driving the bobbins, draft apparatus driven in association with said generators, and means operable to change the delivery speed of said draft apparatus in accordance with a winding movement of bobbins.

ETSURO KATO.